(12) United States Patent
Guo et al.

(10) Patent No.: US 11,579,348 B2
(45) Date of Patent: Feb. 14, 2023

(54) DECORATIVE NEAR-INFRARED TRANSMISSION OPTICAL FILTER DEVICES

(71) Applicant: THE REGENTS OF THE UNIVERSITY OF MICHIGAN, Ann Arbor, MI (US)

(72) Inventors: Lingjie Jay Guo, Ann Arbor, MI (US); Chengang Ji, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 515 days.

(21) Appl. No.: 16/689,701

(22) Filed: Nov. 20, 2019

(65) Prior Publication Data
US 2020/0158931 A1 May 21, 2020

Related U.S. Application Data

(60) Provisional application No. 62/770,102, filed on Nov. 20, 2018.

(51) Int. Cl.
*G02B 5/20* (2006.01)
*B32B 7/02* (2019.01)
*G02B 1/00* (2006.01)

(52) U.S. Cl.
CPC ............. *G02B 5/208* (2013.01); *B32B 7/02* (2013.01); *G02B 1/005* (2013.01); *B32B 2307/418* (2013.01)

(58) Field of Classification Search
CPC ......... G02B 5/281–5/282; G02B 1/005; C09C 1/00–1/66; C08K 3/00–3/40
See application file for complete search history.

(56) References Cited

U.S. PATENT DOCUMENTS 8,848,140 B2 9/2014 Guo et al.
9,261,753 B2 2/2016 Guo et al.
(Continued)

FOREIGN PATENT DOCUMENTS

WO WO-2007077373 A1 * 7/2007 ............. G02B 1/115
WO 2019126543 A1 6/2019

OTHER PUBLICATIONS

Lee et al. "Angular- and polarization-independent structural colors based on 1D photonic crystals", Laser & Photonics Reviews, 9, No. 3, (2015); pp. 354-362.*
(Continued)

*Primary Examiner* — Prashant J Khatri
(74) *Attorney, Agent, or Firm* — Harness, Dickey & Pierce, P.L.C.

(57) ABSTRACT

A colored visibly opaque, highly efficient NIR-transmitting optical filter displaying angle insensitivity is based on one-dimensional photonic crystals. The filter comprises a photonic crystal stack comprising at least one high refractive index layer and two low refractive index layers respectively disposed along a first side and a second side of the high refractive index layer. The photonic crystal stack may have 10 or fewer layers. The filter transmits a first portion of an electromagnetic spectrum having a first range of predetermined wavelengths in an infrared light range or near infrared light range, while reflecting a second portion of the electromagnetic spectrum having a second range of predetermined wavelengths in a visible light range to generate a reflected output. In certain aspects, a refractive index contrast between the at least one high refractive index layer and at least one of the two low refractive index layers is ≥ about 40%.

19 Claims, 8 Drawing Sheets

(56) References Cited

U.S. PATENT DOCUMENTS

Figure 1A:
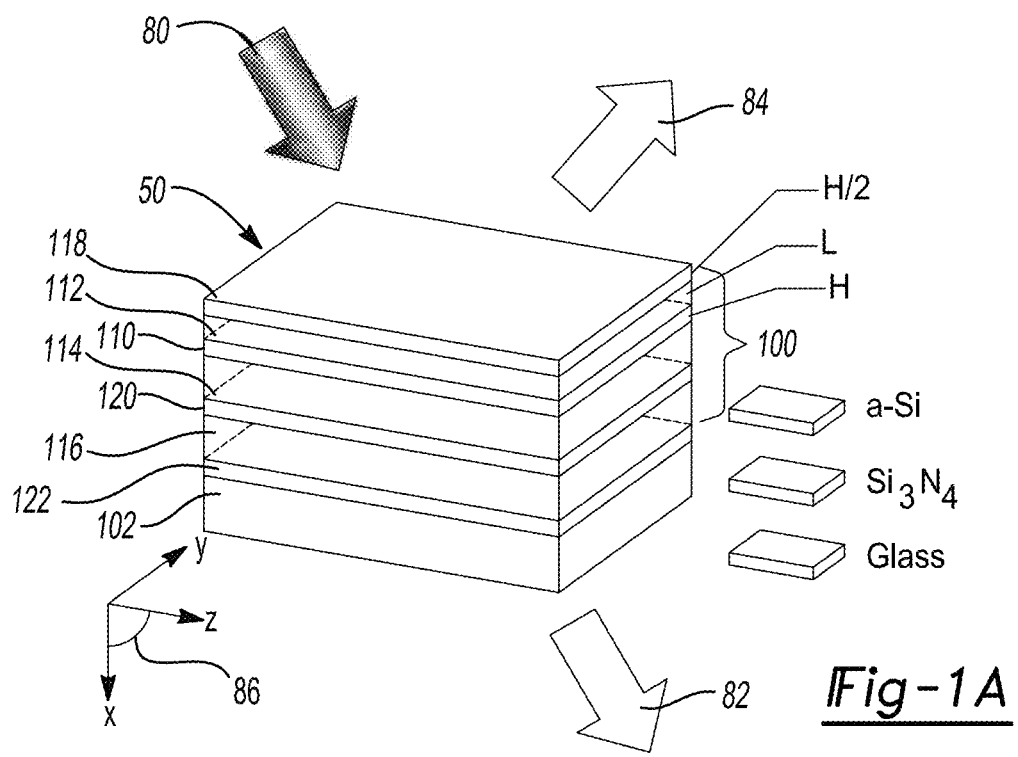

| | | |
|---|---|---|
| 9,547,107 B2 | 1/2017 | Guo et al. |
| 2016/0137846 A1* | 5/2016 | Rueger .................. C01G 23/04 427/372.2 |
| 2016/0254403 A1 | 9/2016 | Guo et al. |
| 2017/0033250 A1* | 2/2017 | Ballif .................. G02B 5/0278 |

OTHER PUBLICATIONS

Dobrowolski, J.A. "Chapter 42: Optical Properties of Films and Coatings", Handbook of Optics: vol. I, Fundamentals, Techniques, and Design, (1995); pp. 42.3-42.130.*

* cited by examiner

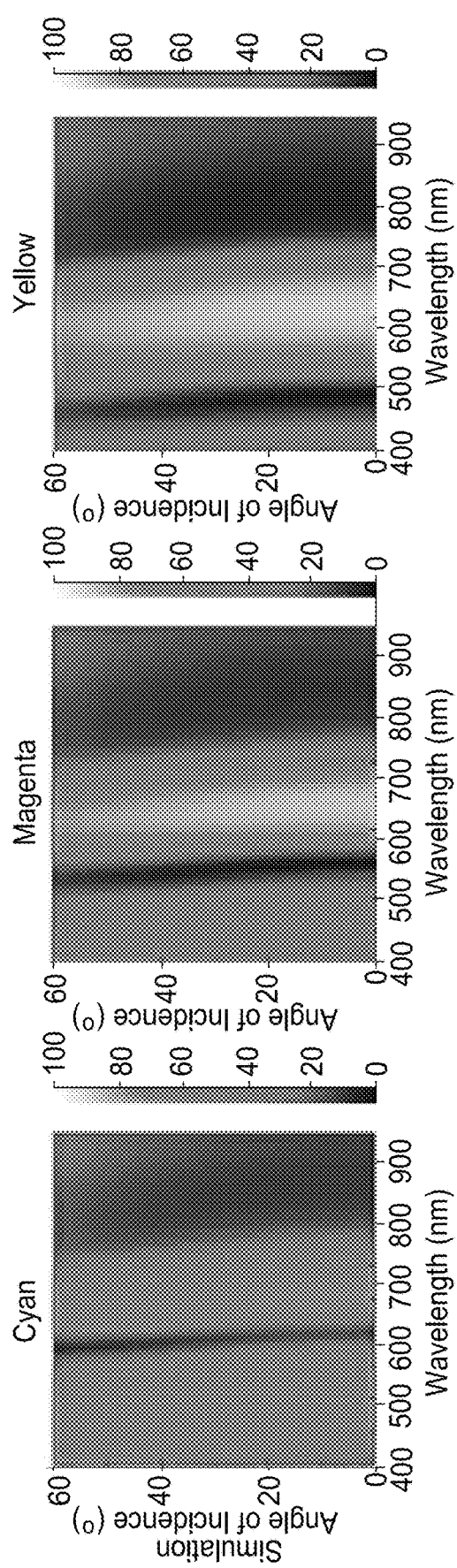
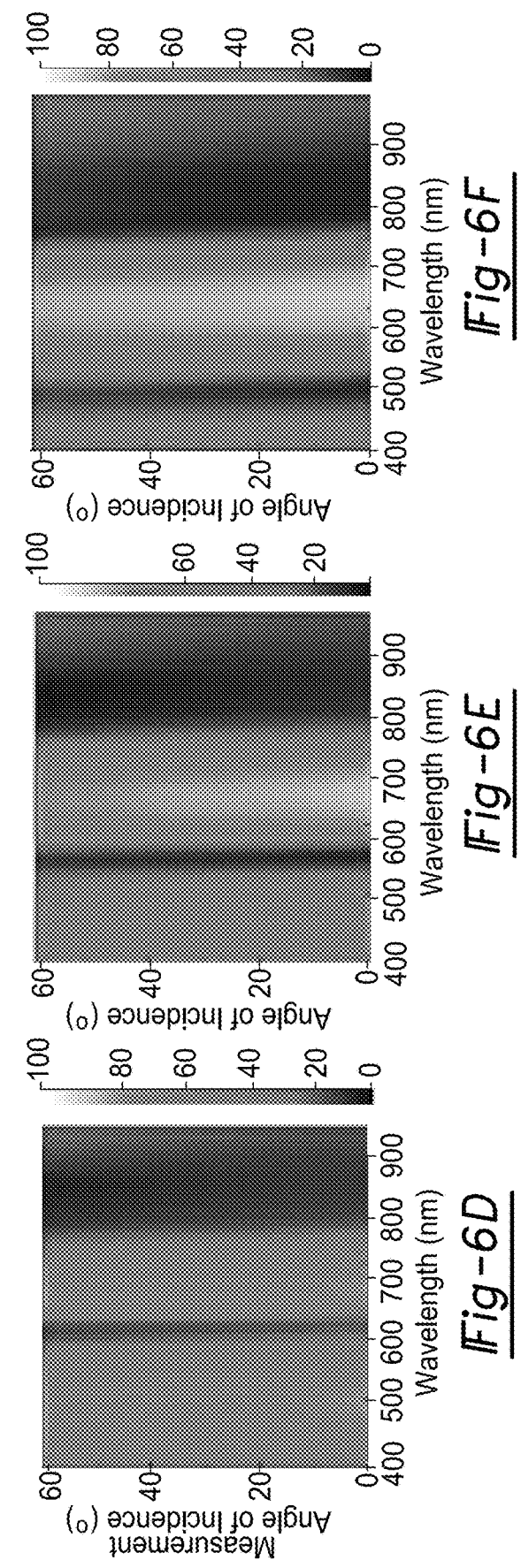
Fig-6A Fig-6B Fig-6C Fig-6D Fig-6E Fig-6F

DECORATIVE NEAR-INFRARED TRANSMISSION OPTICAL FILTER DEVICES

CROSS-REFERENCE TO RELATED APPLICATIONS

This application claims the benefit of U.S. Provisional Application No. 62/770,102, filed on Nov. 20, 2018. The entire disclosure of the above application is incorporated herein by reference.

FIELD

The present disclosure relates to decorative near-infrared transmission filters featuring high-efficiency and angular-insensitivity employing one-dimensional photonic crystal stacks.

BACKGROUND

This section provides background information related to the present disclosure which is not necessarily prior art.

Visibly-opaque, but near-infrared (NIR)-transmitting filters have received considerable interest due to their irreplaceable roles in various applications including NIR spectroscopy, security imaging, optical detections, to name an important few. In recent years, decorative NIR filters that exhibit aesthetic colors are also highly desired to both enhance the signal-to-noise ratio and hide the unappealing appearance of sensors (e.g., proximity sensors, gesture sensors, and camera monitoring systems) integral to advanced technologies in various applications, such as vehicles, cell phones, tablets, and the like.

Organic dyes or pigments that can absorb ultraviolet (UV) and visible light, but transmit NIR waves provide one option. However, these organic materials suffer from short lifetimes due to their susceptibility to environmental factors, such as moisture, high temperature and constant UV exposure. Structural NIR-transmitting filters that are patterned at the subwavelength scale to excite either guided-mode resonance (GMR) or surface plasmon polariton (SPP) have been demonstrated to address the aforementioned challenges. However, the coupling of incident light into those resonances needs to be achieved with the subwavelength gratings, which require complicated fabrication procedures, such as e-beam lithography and focused ion beam milling, rendering them difficult for large-area applications. Moreover, the resulting transmission spectra are highly sensitive to an angle of incidence due to the momentum matching condition, thereby dramatically limiting their potential for many applications.

Another more cost-effective method to create NIR transmission while blocking the visible light uses one-dimensional (1D) photonic crystals (PCs), which are made of periodic layered structures of alternating high and low index materials. By locating the passband in the NIR range, while the stopband in the visible light range, adjustable NIR transmission performance can be achieved by selecting different constituent materials and layer thicknesses. However, as the structures based on single-periodic stacks have very limited stopband bandwidth, stacking of different period units are typically required to produce overlapping multiple stopbands to broaden the stopband, in order to block all the visible light transmission. As a result, these conventional PC-based filters typically more than ten layers, typically up to hundreds of layers, which increases the manufacturing cost and yields issues. It would be desirable to develop a more robust, streamlined, cost-effective, high-efficiency photonic crystal filter capable of transmitting NIR, while blocking certain wavelengths of visible light and thus reflecting certain predetermined colors.

SUMMARY

This section provides a general summary of the disclosure, and is not a comprehensive disclosure of its full scope or all of its features.

The present disclosure provides an optical filter that may comprise a photonic crystal stack. The photonic crystal stack may comprise at least one high refractive index layer that defines a first side and an opposite second side. The photonic crystal stack also comprises at least two low refractive index layers respectively disposed along the first side and the second side. The photonic crystal stack has less than or equal to 10 total layers and the filter is capable of transmitting a first portion of an electromagnetic spectrum having a first range of predetermined wavelengths in an infrared light range or near infrared light range and reflecting a second portion of the electromagnetic spectrum having a second range of predetermined wavelengths in a visible light range to generate a reflected output.

In one aspect, the optical filter displays angle insensitive behavior. Thus, the reflected output displays minimal angle dependence such that the second range of wavelengths varies less than or equal to about 80 nm at an incidence angle ranging from about 0° to about 60° with respect to the colored filter to form an angle insensitive colored filter.

In one aspect, the photonic crystal stack comprises between 5 and 7 layers.

In one aspect, a refractive index contrast between the at least one high refractive index layer and at least one of the two low refractive index layers is greater than or equal to about 40%.

In one aspect, the at least one high refractive index layer has a first refractive index of greater than or equal to about 2 and the at least two low refractive index layers respectively have a second refractive index of less than or equal to about 2. Further, a difference between the first refractive index layer and at least one of the at least two second refractive index layers is greater than or equal to about 0.5.

In one aspect, the photonic crystal stack is disposed on a transparent substrate.

In one aspect, the photonic crystal stack comprises at least three low refractive index layers and at least four high refractive index layers to define a one-dimensional ternary photonic crystal.

In one aspect, the at least one high refractive index layer comprises a material selected from the group consisting of: semiconductors comprising amorphous silicon (a-Si), germanium (Ge), metal oxides and sulfides, semiconductor nitrides comprising ferric oxide ($Fe_2O_3$), cupric oxide (CuO), vanadium pentoxide ($V_2O_5$) titanium oxide ($TiO_2$), zinc oxide (ZnO), hafnium oxide ($HfO_2$), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof.

In one aspect, the at least two low refractive index layers independently comprise a material selected from the group consisting of: semiconductor oxides or nitrides comprising silicon nitride ($Si_3N_4$), silicon dioxide ($SiO_2$), metal oxides and sulfides comprising zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof.

In one aspect, greater than or equal to about 40% of the first portion of an electromagnetic spectrum having the first range of predetermined wavelengths is transmitted through the optical filter.

In one aspect, each of the at least two low refractive index layers has a thickness of greater than or equal to about 25 nm to less than or equal to about 150 nm.

In one aspect, each at least one high refractive index layer has a thickness of greater than or equal to about 10 nm to less than or equal to about 25 nm.

In one aspect, the reflected output with the second range of predetermined wavelengths has a color selected from the group consisting of: black, red, green, blue, white, cyan, magenta, yellow, and combinations thereof.

In one aspect, the reflected output with the second range of predetermined wavelengths has a mirror-like appearance.

In one aspect, the at least one high refractive index layer comprises an amorphous silicon (a-Si) and the at least two low refractive index layers comprise silicon nitride ($Si_3N_4$).

In one aspect, the at least two low refractive index layers comprise a first low refractive index layer and a second low refractive index layer. The first low refractive index layer has a thickness of greater than or equal to about 25 nm to less than or equal to about 45 nm. The second low refractive index layer has a thickness of greater than or equal to about 130 nm to less than or equal to about 150 nm. Further, the at least one high refractive index layer has a thickness of greater than or equal to about 10 nm to less than or equal to about 25 nm.

In one aspect, the filter is in the form of a plurality of pigment particles.

In one aspect, the device is selected from the group consisting of: an imaging sensor, an optical measurement system, a mobile device, a vehicle, a decoration, an anti-counterfeit tag, and combinations thereof.

The present disclosure provides a process of making a plurality of optical filter particles. The process comprises forming a photonic crystal stack via a vacuum deposition process. The photonic crystal stack comprises at least one high refractive index layer that defines a first side and an opposite second side and at least two low refractive index layers respectively disposed along the first side and the opposite second side. The photonic crystal stack has less than or equal to 10 total layers and the photonic crystal stack is capable of transmitting a first portion of an electromagnetic spectrum having a first range of predetermined wavelengths in an infrared light range or near infrared light range and reflecting a second portion of the electromagnetic spectrum having a second range of predetermined wavelengths in a visible light range to generate a reflected output. The method also comprises breaking the photonic crystal stack into a plurality of pigment particles capable of being applied to a surface.

In one aspect, the at least one high refractive index layer comprises an amorphous silicon (a-Si) and the at least two low refractive index layers comprise silicon nitride ($Si_3N_4$).

In one aspect, the at least two low refractive index layers comprise a first low refractive index layer and a second low refractive index layer, wherein the first low refractive index layer has a thickness of greater than or equal to about 25 nm to less than or equal to about 45 nm, the second low refractive index layer has a thickness of greater than or equal to about 130 nm to less than or equal to about 150 nm, and the at least one high refractive index layer has a thickness of greater than or equal to about 10 nm to less than or equal to about 25 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
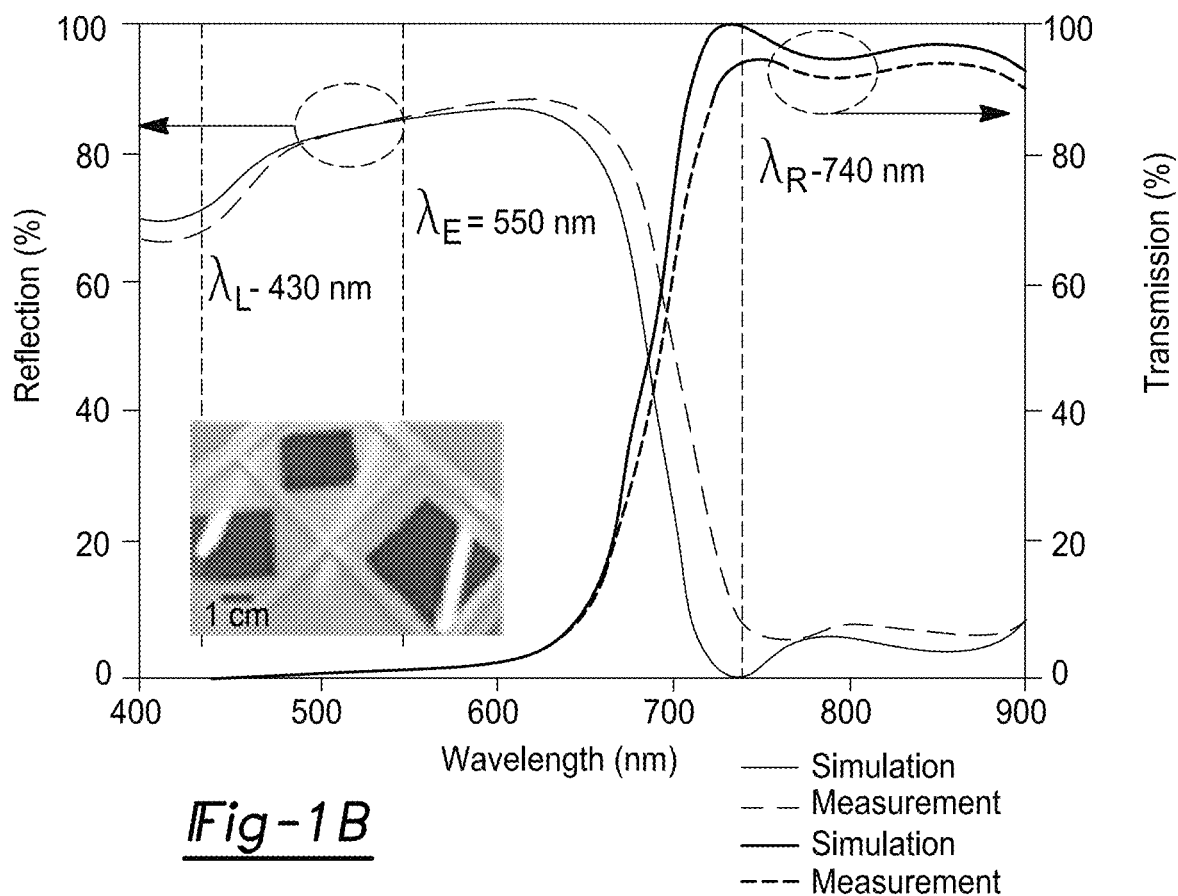

FIGS. 1A-1B. FIG. 1A is a schematic diagram of a transmissive structure color filter employing a one-dimensional (1D) ternary photonic crystal stack (PCs) prepared in accordance with certain aspects of the present disclosure. FIG. 1B shows simulated and measured spectra of a filter like that shown in FIG. 1A. Transmission below 650 nm is greatly suppressed due to both a broad stopband resulting from the high refractive index materials and slight loss of a-Si. The inset at the bottom-left corner of FIG. 1B shows fabricated samples having mirror-like reflection as the visible light is suitably blocked. The scale bar is 1 cm.

Figure 2A:
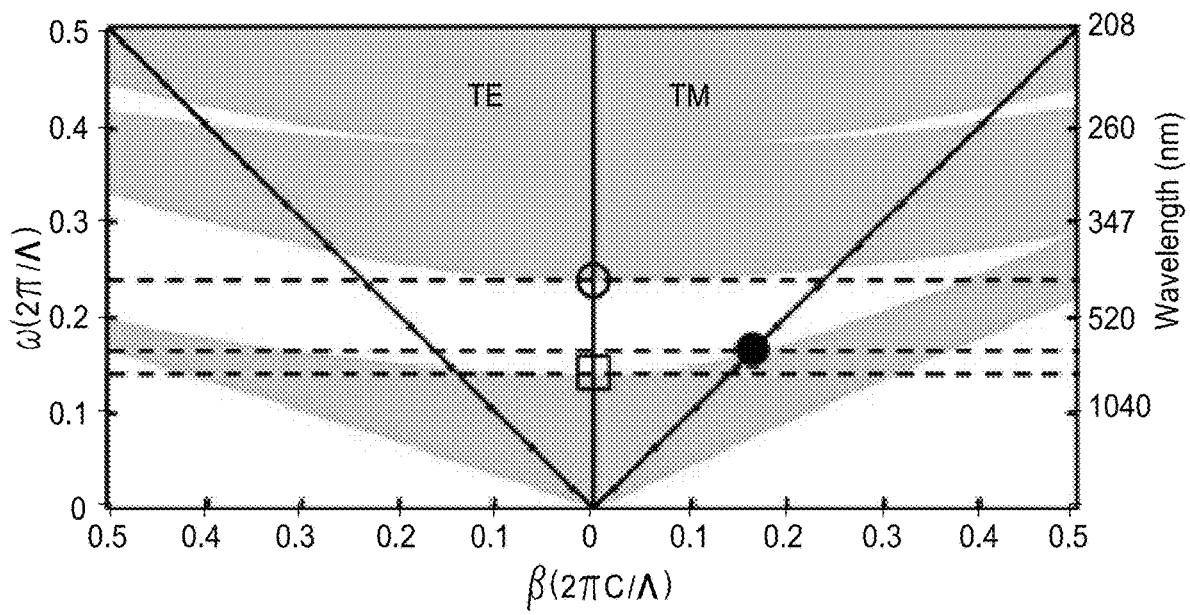
Figure 2B:
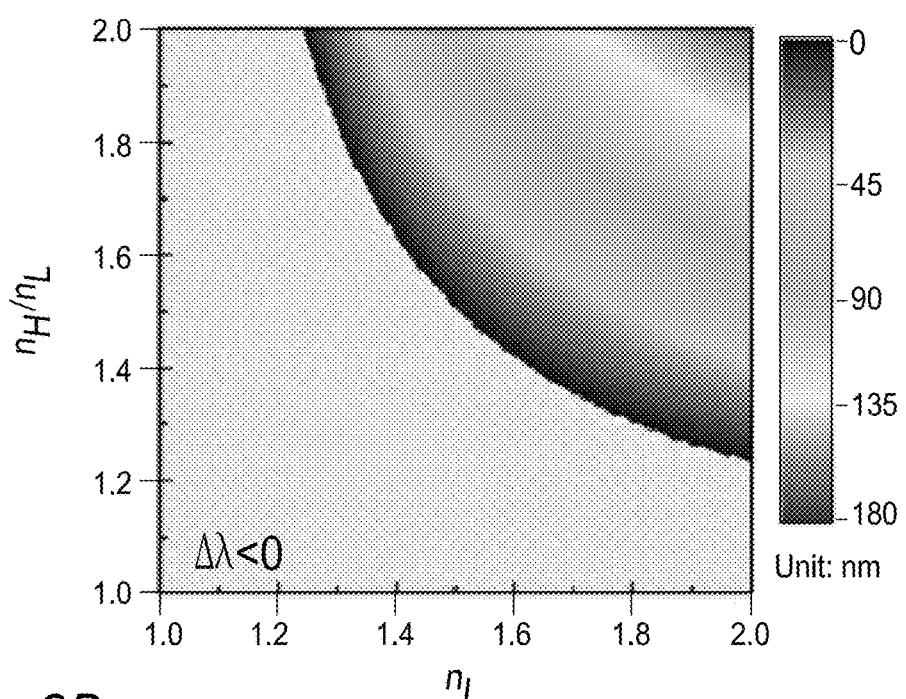

FIGS. 2A-2B shows projected band structures for both transverse-magnetic (TM) polarized light and/or transverse-electric (TE) polarized light calculated from a characteristic matrix of ternary PCs prepared in accordance with certain aspects of the present disclosure. FIG. 2B shows the dependency of the omnidirectional stopband of the ternary PCs on the constituent low refractive index material and refractive index contrast. The region where $\Delta\lambda<0$ indicates that omnidirectional stopband does not exist in these cases, in other words, no light will be blocked at all angles. The color scale represents the bandwidth of the omnidirectional stopband.

Figure 3A:
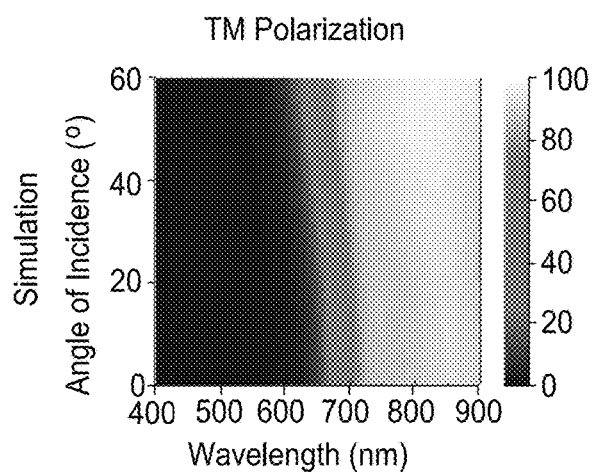
Figure 3B:
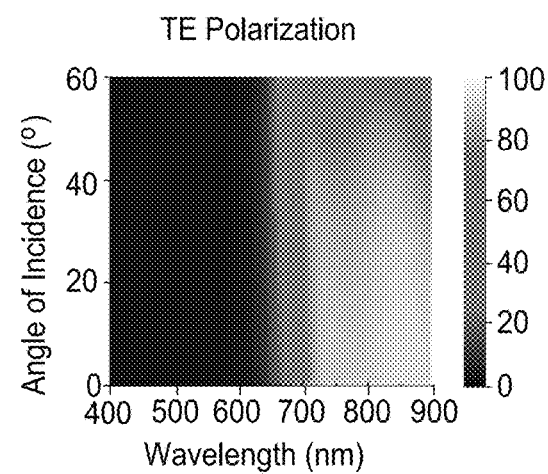
Figure 3C:
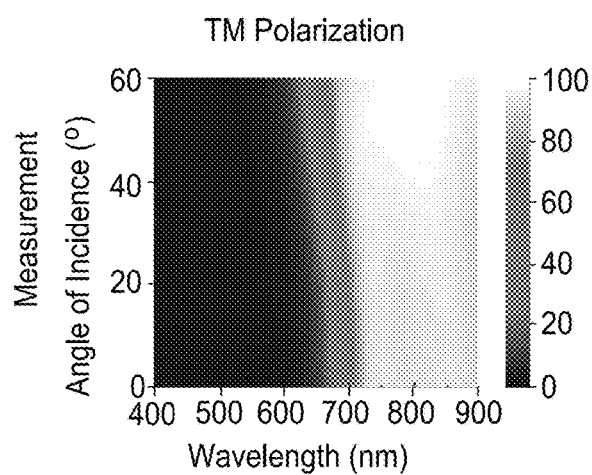
Figure 3D:
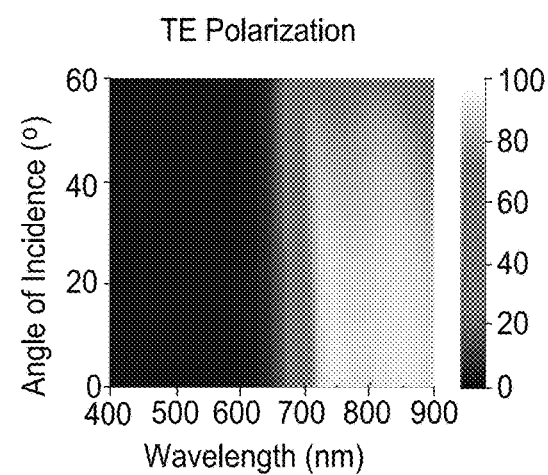
Figure 3E:
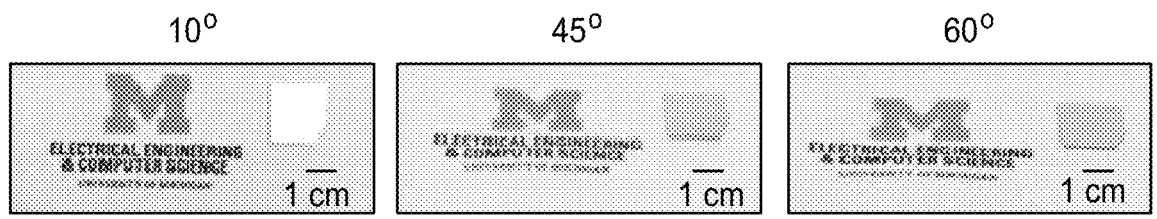

FIGS. 3A-3E. FIG. 3A shows the simulated angle-resolved transmission spectra for TM polarizations of a filter device prepared in accordance with certain aspects of the present disclosure, while FIG. 3B shows the simulated angle-resolved transmission spectra for TE polarizations. FIG. 3C shows the measured angle-resolved transmission spectra for TM polarizations, while FIG. 3D shows the measured angle-resolved transmission spectra for TE polarization for filter devices prepared in accordance with certain aspects of the present disclosure. The measured values in FIGS. 3C-3D show good agreement with the calculated results in FIGS. 3A-3B. FIG. 3E is an optical photograph of fabricated samples at different observing angles under ambient light, showing robust mirror-like images over a wide-angle range. The scale bars are 1 cm.

Figure 4A:
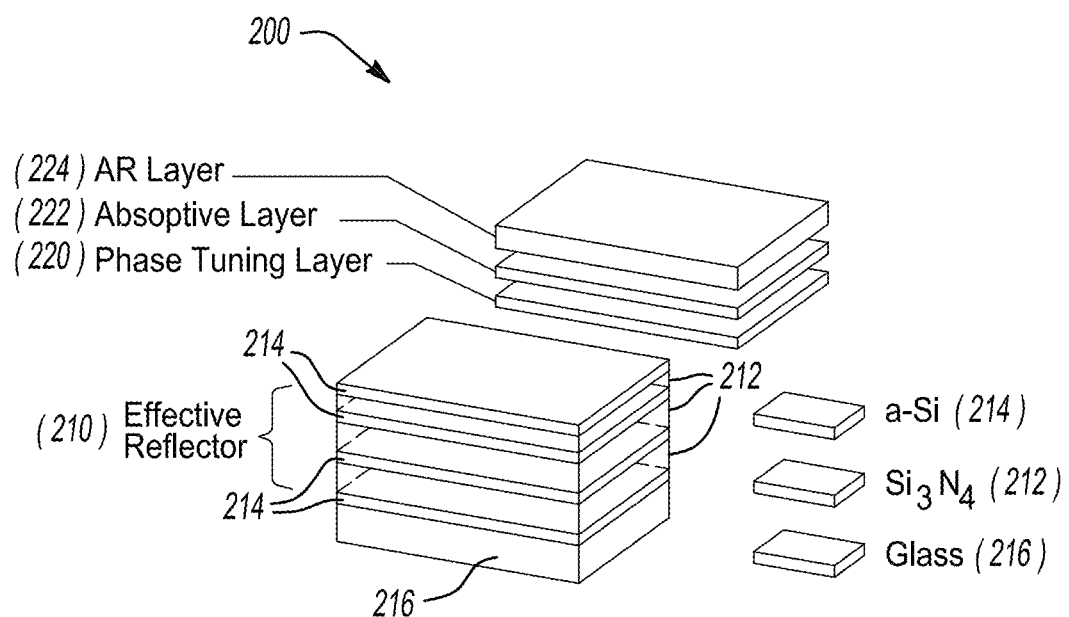
Figure 4B:
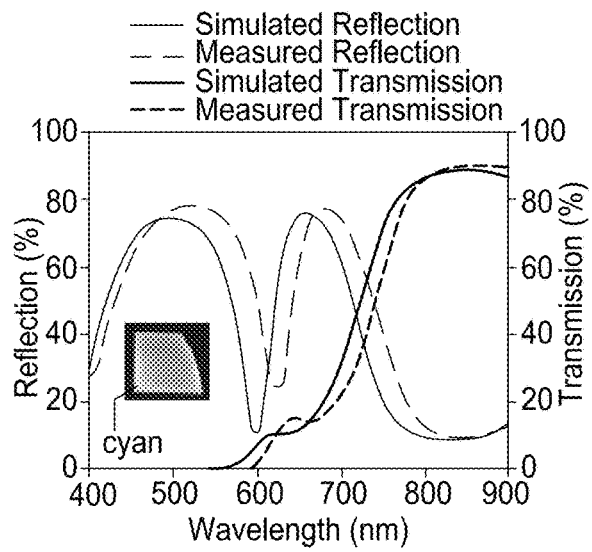
Figure 4C:
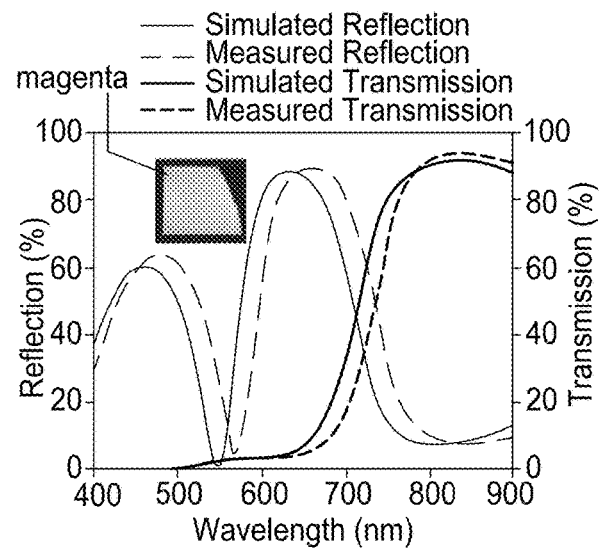
Figure 4D:
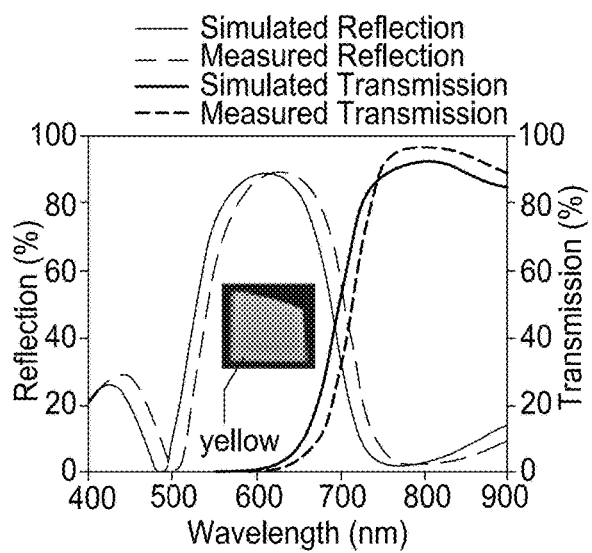
Figure 4E:
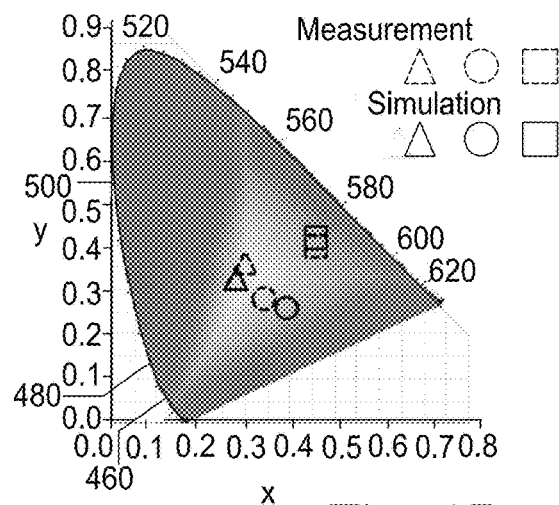

FIGS. 4A-4E. FIG. 4A shows a schematic diagram of a new design of a decorative visibly opaque, but NIR-transmitting filter prepared in accordance with certain alternative aspects of the present disclosure. FIGS. 4B-4D show simulated and measured optical performance of CMY colored NIR-transmitting filters. Insets show the optical images of fabricated devices on silica substrates. The scale bars are 1 cm. FIG. 4E shows colored appearance of decorative NIR-transmitting devices evaluated on the CIE 1931 chromaticity diagram. The color coordinates calculated from the measured reflection spectra of CMY colors are (0.30, 0.36), (0.34, 0.28), and (0.46, 0.38), respectively, showing good match with the simulated results (cyan (0.28, 0.33), magenta (0.39, 0.26), and yellow (0.46, 0.42)).

Figure 5B:
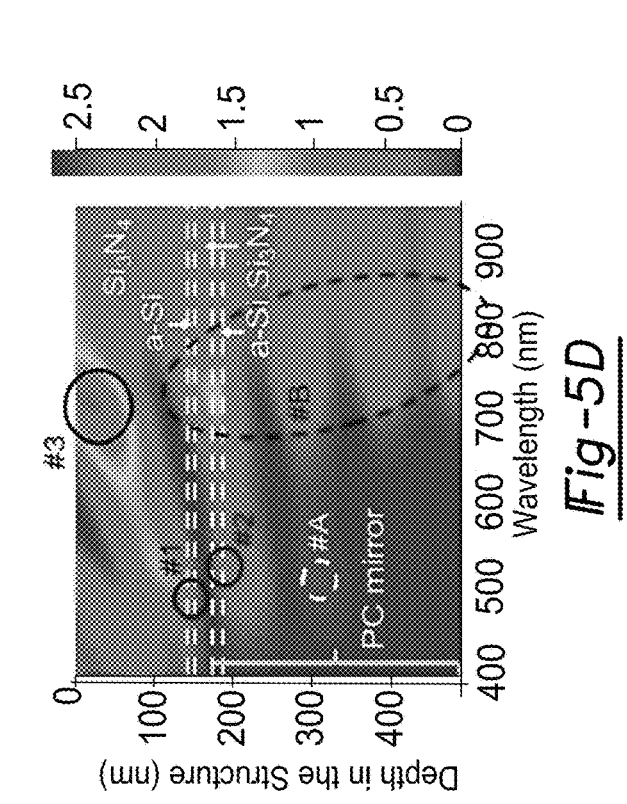
Figure 5A:
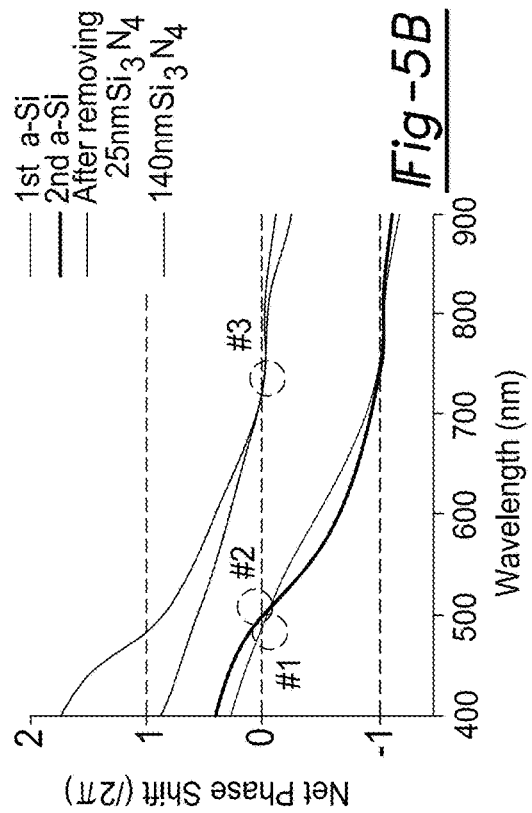
Figure 5D:
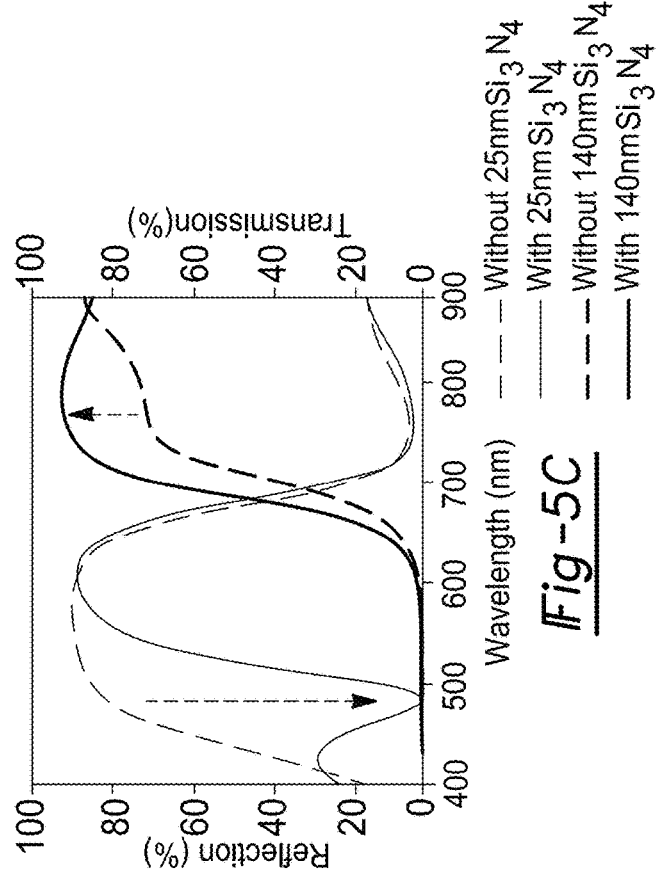
Figure 5C:
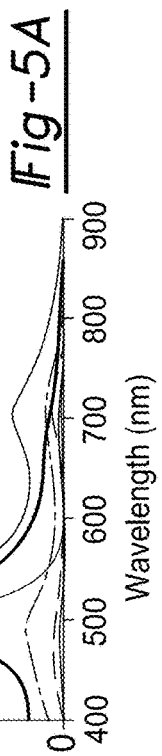

FIGS. 5A-5D. FIG. 5A shows total absorption spectra and separate absorption in each a-Si layer of a photonic crystal stack prepared in accordance with certain aspects of the present disclosure. The absorption mainly occurs in the first and second a-Si layers. FIG. 5B shows calculated net phase shift, which includes two reflection phase shifts occurring upon both the top and bottom interfaces and the propagation phase accumulation within the layer, analyzing the functions of the additionally added thin and thick low refractive index $Si_3N_4$ layers. FIG. 5C shows a comparison of spectra of the stacks with and without thin (thick) $Si_3N_4$, indicating the phase tuning (anti-reflection) function of the added $Si_3N_4$ layer. FIG. 5D shows wavelength-dependent electric field distribution inside the entire structure. The strong field in the short wavelength range confined inside the first and second a-Si layers directly results in the efficient absorption, thereby generating the decorative color. The additional added 140 nm $Si_3N_4$ atop effectively induces the strong NIR transmission by exciting AR resonances beyond 700 nm wavelength.

Figure 6G:
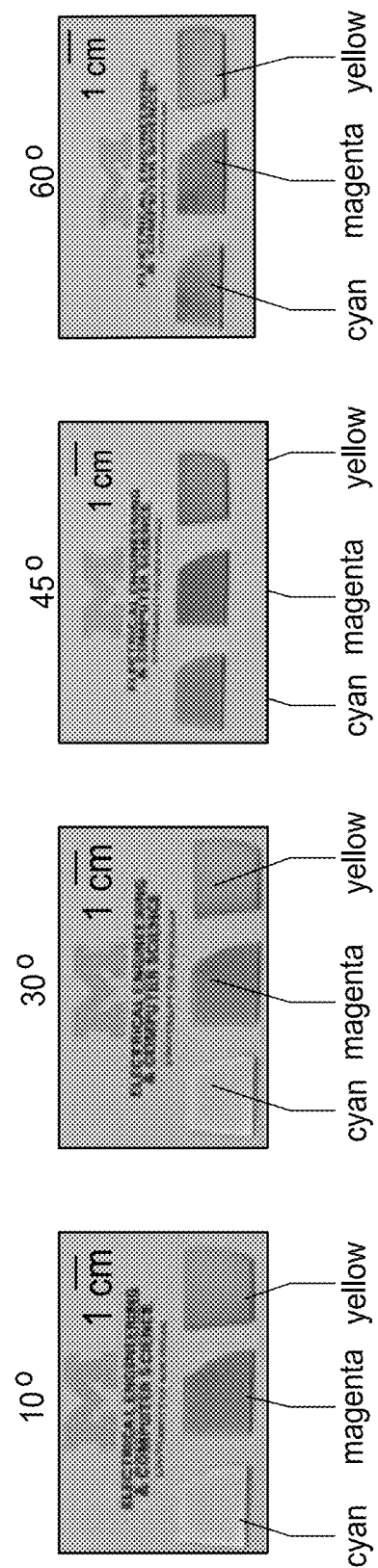

FIGS. 6A-6G. FIGS. 6A-6C show simulated angle-resolved reflection spectra for cyan (C), magenta (M), and yellow (Y) colors under unpolarized light illumination for filter devices prepared in accordance with certain aspects of the present disclosure. FIGS. 6D-6F show corresponding measured angle-resolved reflection spectra for three colored filter devices under unpolarized light illumination. The flat dispersion curves in both simulated and measured results indicate superior angular-insensitivity of such filter devices. FIG. 6E shows optical images of fabricated CMY colored samples at different observing angles under ambient light, validating the angular-robust colors desired for decorative applications. The scale bars are 1 cm.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure contemplates an optical filter that may be angle insensitive. The filter may comprise a photonic crystal stack comprising at least one low refractive index layer and at least two high refractive index layers. In certain aspects, the photonic crystal stack comprises 10 or fewer total layers, including all low refractive index and high refractive index layers. In one variation, at least one refractive index layer in the photonic crystal stack defines a first side and an opposite second side, so that at least two high refractive index layers are respectively disposed along the first side and the second side to sandwich at least one refractive index layer. The angle insensitive optical filter is capable of transmitting a first portion of an electromagnetic spectrum having a first range of predetermined wavelengths and generating an output, for example, an output of a second portion of the electromagnetic spectrum having a second range of predetermined wavelengths. The output may be generated by the filter absorbing/blocking or reflecting the second portion having the second range of predetermined wavelengths. In certain aspects, the first portion of an electromagnetic spectrum is in an infrared light range or near infrared light range, while the second portion of the electromagnetic spectrum is in a visible light range. In certain aspects, the angle insensitive filter is capable of substantially blocking transmission of the second portion of the electromagnetic spectrum in the visible light range, so that the surface of the filter appears to be opaque.

As shown in FIG. 1A, an electromagnetic wave 80, such as sunlight, is directed towards an angle insensitive filter 50. In various aspects, the filter 50 is capable of transmitting a first portion of that electromagnetic wave 80 having a first range of predetermined wavelengths, shown at arrow 82. The filter 50 further prevents a second portion of the electromagnetic spectrum/electromagnetic wave 80 having a second range of predetermined wavelengths from transmitting into the filter 50 and is capable of reflecting at least part of the second portion of the electromagnetic wave 80 to generate an output 84 (for example, a reflected output) that displays minimal angle dependence with respect to an incidence or viewing angle 86 from which the filter 50 may be viewed or observed (e.g., by a human or machine). As shown in FIG. 1, the viewing angle 86 is 90°, but may vary based on the position of observation to be anywhere from greater than 0° to less than 180° (e.g., ±90°).

The output 84 generated by the filter 50 may have a predetermined range of wavelengths in the visible light range. In the visible range of electromagnetic radiation, wavelengths in a range of about 625 nm to 740 nm are red; orange is at about 590 nm to about 625 nm; yellow is at about 565 nm to about 590 nm; green is at about 520 nm to about 565 nm; blue or cyan is at about 500 nm to about 520 nm; blue or indigo is at about 435 nm to about 500 nm; and violet is at about 380 nm to about 435 nm. Notably, as used herein, blue may encompass blue/cyan, blue/indigo, and violet. In certain aspects, the output 84 of electromagnetic radiation can have a wavelength in a range of greater than or equal to about 625 nm to less than or equal to about 740 nm for red; a range of greater than or equal to about 520 nm to less than or equal to about 565 nm for green; a range of greater than or equal to about 500 nm to less than or equal to about 520 nm for blue or cyan, and a range of greater than or equal to about 435 nm to less than or equal to about 500 nm for blue or indigo. Further, in certain aspects, the reflected light may be extra-spectral or a mixture of several different wavelengths. For example, magenta is an extra-spectral mixture of red (625 nm to 740 nm) and blue (435 nm to 500 nm) wavelengths. In certain aspects, the output 84 may appear white (reflecting all colors) or black (absorbing substantially all colors in the visible spectrum). The external surface of the filter device 50 may be opaque to an observer.

The first range of predetermined wavelengths, shown at arrow 82, transmitted into the filter 50 may have wavelengths in the range of infrared electromagnetic radiation including infrared radiation (IR) ranging from about 0.75 μm to about 350 including near infrared (NIR) ranging from about 0.75 μm to about 2.5 μm.

In certain aspects, the filter 50 exhibits minimal angle dependence, which corresponds to an output 84 having a second predetermined range of wavelengths that varies less than or equal to about 80 nm; optionally less than or equal to 70 nm; optionally less than or equal to 60 nm when comparing a difference between a first wavelength at an incidence or viewing angle of 0° as compared to a second wavelength at an incidence angle of 60°. Minimal deviation in wavelength of an output can be expressed as minimal angle dependence. In certain particularly advantageous variations, the filter 50 has minimal angle dependence and is capable of generating an output 84 having a predetermined range of wavelengths (e.g., has a wavelength shift) that deviates less than or equal to 50 nm when the filter 50 is observed from incidence angles ranging from 0 to 60°; optionally less than or equal to about 45 nm; optionally less than or equal to 40 nm; optionally less than or equal to 35 nm; optionally less than or equal to 30 nm; based on a range of incidence potential angles (when comparing a difference between a first wavelength of interest observed at an incidence angle of 0° as compared to a second wavelength observed at an incidence or viewing angle of 60°). In certain aspects, the angle insensitive filter 50 has a non-iridescent appearance with minimal wavelength variation described above up to ±60°. The minimal angle dependence applies for either transverse-magnetic (TM) polarized light and/or transverse-electric (TE) polarized light.

In accordance with certain aspects of the present disclosure, a colored NIR transmission filter is contemplated that blocks visible light transmission, while optionally creating a desired color reflection. Thus, decorative visibly opaque, but near-infrared transmitting filters having high-efficiency and angular-insensitivity employing one-dimensional photonic crystals are contemplated. Different reflective colors can be generated without affecting the near-infrared transmission performance. In certain variations, as discussed further herein, the photonic crystal may be a one-dimensional photonic crystal having less than or equal to about 10 total layers, for example, having between 5 and 7 layers. In certain variations, as discussed further herein, the photonic crystal may be a one-dimensional ternary photonic crystal comprising 7 layers. In this manner, such a design takes advantage of absorptive properties of constituent high refractive index semiconductor layers (e.g., a-Si) in the visible range, as well as various reflection colors (not limited to the one complementary to the transmissive spectrum), which can be generated without affecting the transmission performance. In this manner, the angle insensitive filter devices can be used for decoration applications and to "hide" objects behind or beneath the filter devices. In certain aspects, the proposed structural color exhibits ultrahigh transmission efficiency, for example, having a maximum nearing 100% transmission of the desired range of wavelengths and an angle invariant property up to ±60° regardless of the polarization state of incident light from both illumination directions due to the low loss and high refractive indices of the materials used. Moreover, the streamlined design of such colored angle insensitive filter devices requires only thin film deposition for fabrication, thus enabling large-scale manufacturing for practical applications. In certain non-limiting aspects, the filter devices provided by the present teachings can be used in various applications, such as imaging sensors, including those in mobile devices and vehicles, optical measurement systems, decorations, anti-counterfeit tags and devices, and the like.

With renewed reference to FIG. 1A, a photonic crystal stack 100 that serves as an effective reflector in the filter device 50 is disposed on a substrate 102. The substrate 102 may be transparent to the first portion of the electromagnetic spectrum 82 that is transmitted through the device 50. In one example, the substrate 102 is formed of silica.

The photonic crystal stack 100 comprises at least one high refractive index layer 110. At least two distinct low refractive index layers, namely a first low refractive index layer 112 and a second low refractive index layer 114, are respectively disposed along a first side of the high refractive index layer 110 and an opposite second side high refractive index layer 110. In certain variations, the first low refractive index layer 112 can serve as an anti-reflection layer while the second low refractive index layer 114 serves as a phase turning layer. The high refractive index layer 110 can serve as an absorptive layer. The filter device 50 having such a photonic crystal stack 100 is capable of transmitting the first portion of an electromagnetic spectrum having a first range of predetermined wavelengths 82 (e.g., IR or near IR) and reflecting the second portion of the electromagnetic spectrum having a second range of predetermined wavelengths (e.g., in the visible range) to generate the output 84. As noted above, in certain aspects, the reflected output 84 displays minimal angle dependence as described above.

The photonic crystal stack 100 may have 10 or fewer total layers, including both high and low refractive index layers, optionally between 5 and 7 total layers. For example, in one variation like that shown in FIG. 1A, the photonic crystal stack 100 comprises at least three low refractive index layers, namely first low refractive index layer 112, second low refractive index layer 114, and third low refractive index layer 116. The photonic crystal stack 100 also comprises at least four high refractive index layers, including first high refractive index layer 110, second high refractive index layer 118, third high refractive index layer 120, and fourth high refractive index layer 122. The second high refractive index layer 118 is disposed adjacent to the first low refractive index layer 112. The third high refractive index layer 120 is disposed between second low refractive index layer 114 and third low refractive index layer 116. The fourth high refractive index layer 122 is disposed between the third low refractive index layer 116 and substrate 102. In this manner, the photonic crystal stack 100 defines a one-dimensional ternary photonic crystal.

In certain aspects, there is a high index contrast between the at least one high refractive index layer and the adjacent low refractive index layer, for example, a difference in the refractive indices ($n_H$-$n_L$) of greater than or equal to about 0.5, optionally greater than or equal to about 1, optionally greater than or equal to about 1.5, and in certain aspects, optionally greater than or equal to about 2. Stated in another way, a difference in the refractive indices of the high refractive index layer and the low refractive index layer is substantial, for example, the refractive index contrast is at least about a 40% difference between the low refractive index and the high refractive index (($n_H$-$n_L$)/$n_L$), optionally a refractive index contrast between the at least one high refractive index layer and at least one of the two low refractive index layers is greater than or equal to about 60%, optionally greater than or equal to about 80%, optionally greater than or equal to about 100%, optionally at least about a 150% difference, optionally at least about a 200% difference, and in certain aspects, optionally at least about a 250% difference. Thus, the materials selected for the high refractive index layer and the low refractive index layer provide such a high refractive index contrast. In certain aspects, the at least one high refractive index layer has a real part of a refractive index of greater than or equal to about 2, optionally greater than or equal to about 3, and optionally greater than or equal to about 4. The at least two low refractive index layers respectively have a real part of the refractive index of less than or equal to about 2.

In one variation, the at least one high refractive index layer comprises a material selected from the group consisting of: semiconductors such as amorphous silicon (a-Si), germanium (Ge); metal oxides or sulfides such as ferric oxide ($Fe_2O_3$), cupric oxide (CuO), vanadium pentoxide ($V_2O_5$) titanium oxide ($TiO_2$), zinc oxide (ZnO), hafnium oxide ($HfO_2$), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof. In certain aspects, each of the high refractive index layers in the photonic crystal stack may comprise or be formed of the same material.

In another variation, the at least two high refractive index layers independently comprise a material selected from the group consisting of: silicon nitride ($Si_3N_4$), silicon dioxide ($SiO_2$), certain types of metal oxide, nitride or fluoride such as zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), aluminum oxide ($Al_2O_3$), magnesium fluoride ($MgF_2$), polymers, and combinations thereof. Sulfides such as zinc selenide (ZnSe), zinc sulfide (ZnS) can also be used when certain semiconductors are used as high refractive index layers. In certain aspects, each of the low refractive index layers in the photonic crystal stack may comprise or be formed of the same material.

In certain variations, the at least one high refractive index layer comprises a material selected from the group consisting of: an amorphous silicon (a-Si), titanium oxide ($TiO_2$), and combinations thereof. Further, the at least two low refractive index layers independently comprise a material selected from the group consisting of: silicon nitride ($Si_3N_4$), and silicon dioxide ($SiO_2$), and combinations thereof.

In certain variations, one or more layers in the crystal photonic stack may have a quarter-wavelength thickness. For example, in certain aspects, each of the at least two low refractive index layers has a respective thickness of greater than or equal to about 5 nm to less than or equal to about 300 nm. In certain variations, each at least one high refractive index layer has a thickness of greater than or equal to about 5 nm to less than or equal to about 200 nm, optionally greater than or equal to about 5 nm to less than or equal to about 150 nm, optionally greater than or equal to about 10 nm to less than or equal to about 100 nm, and in certain variations, optionally greater than or equal to about 10 nm to less than or equal to about 150 nm. In certain other variations, two of the at least two refractive index layers have distinct thicknesses from one another, which can create desired colors reflecting from the device. For example, a first low refractive index layer may have a thickness of greater than or equal to about 25 nm to less than or equal to about 45 nm, while a second low refractive index layer may have a thickness of greater than or equal to about 130 nm to less than or equal to about 150 nm, optionally about 140 nm.

In various aspects, the angle insensitive filter devices may have a high transmission efficiency. For example, greater than or equal to about 40% of the first portion of an electromagnetic spectrum having the first range of predetermined wavelengths is transmitted through the angle insensitive filter device, for example IR or NIR light. In other aspects, greater than or equal to about 50% of the first portion of an electromagnetic spectrum having the first range of predetermined wavelengths, optionally greater than or equal to about 60%, optionally greater than or equal to about 98%, optionally greater than or equal to about 70%, optionally greater than or equal to about 97%, optionally greater than or equal to about 80%, optionally greater than or equal to about 98%, optionally greater than or equal to about 90%, optionally greater than or equal to about 98%, optionally greater than or equal to about 99%, is transmitted through the angle insensitive filter device In one aspect, the reflected output with the second range of predetermined wavelengths has a color selected from the group consisting of: black, white, red, green, blue, cyan, magenta, yellow, mirror-like color, and combinations thereof.

Accordingly, in certain variations, visibly opaque, but near-infrared-transmitting filters are provided that may include one-dimensional ternary photonic crystals having seven layers that reach nearly 100% transmission efficiency in the near-infrared light region. Different decorative reflection colors can be created by adding additional layers (e.g., an additional three layers), while maintaining the near-infrared transmission performance. In addition, structural colors show great angular insensitivity up to ±60° for both transverse electric and transverse magnetic polarizations, which are highly desired in various fields. The facile strategy described here involves a simple deposition method for the fabrication, thereby having great potential in diverse applications such as image sensors, anti-counterfeit tag, and optical measurement systems, by way of non-limiting example.

In one aspect, the photonic crystal stack is formed via a vacuum deposition process. In certain variations, the filter may be in the form of a plurality of pigment particles. Thus, after forming the photonic crystal stack, it may be broken into the plurality of pigment particles. The plurality of pigment particles can be applied to a surface. For example, the pigment particles can be applied by a conventional solution coating process (such as spray-coating, dip-coating, screen-printing, and the like).

FIG. 1A thus shows schematic diagrams of an embodiment prepared in accordance with certain aspects of the present disclosure featuring angular- and polarization-independent NIR transmission. Such a design is targeted at high transmissive efficiency employing three stacks of "H/2LH/2" unit as an effective antireflective (AR) coating based on Herpin's equivalent index. Here, H and L denote the high and low refractive index materials with a quarter-wavelength thickness, separately (i.e., $H=\lambda_c/4n_H$ and $L=\lambda_c/4n_L$). Selecting a central wavelength of the stopband as $\lambda_c=550$ nm and amorphous silicon (a-Si, refractive index $n_H=4.4+i0.27$) and silicon nitride ($Si_3N_4$, refractive index $n_1=1.9$) as H (thickness of approximately 32 nm) and L (thickness of approximately 72 nm) layers, respectively, the stopband bandwidth can be calculated from $\Delta(\lambda_c/\lambda)=(4/\pi)\sin^{-1}[(n_H-n_L)/(n_H+n_L)]$ with the left and right band edge located at $\lambda_L=430$ nm and $\lambda_R=740$ nm, respectively (FIG. 1B). It should be noted that both H and $\Delta\lambda$ are approximated using the real part of refractive index of a-Si in the calculation considering its small but nonzero extinction efficiency. Based on the above equation, such a broad stopband is a direct consequence of the high index contrast between the high (a-Si) and low ($Si_3N_4$) index materials used in the design (a difference between $n_H$ and $n_L$ of about 2.5). Due to the wide range stopband together with the semiconductor loss, visible incidence (wavelength<650 nm) is effectively blocked with only 7 layers as shown by the spectra in FIG. 1B. As a result, the fabricated samples show mirror-like bright reflection (inset at the bottom-left corner).

As a comparison, the simulated reflection and transmission spectra of the 7-layered PC structure based on lower refractive index material combinations (i.e., employing $TiO_2$ (refractive index $n_1=2.3$) and $SiO_2$ (refractive index $n_1=1.45$) as the high and low index materials), is also tested. Its stopband bandwidth (e.g., the range of wavelengths that do not pass) is much narrower and visible light can pass through the stack even within the stopband range. The thickness of $TiO_2/SiO_2$ is designed so that the center wavelength of the stopband is located at the same position ($\lambda_c=550$ nm). Due to the negligible absorption loss of both a-Si and $Si_3N_4$ materials beyond 700 nm, high transmission close to unity (99.88% at 735 nm) can be achieved at normal incidence in NIR range as plotted in FIG. 1B showing excellent agreement between the calculated and measured results.

Here, the simulations are performed based on the transfer matrix method with the refractive indices of materials, calibrated using a spectroscopic ellipsometer (M-2000, J. A. Woollam), while the reflection and transmission spectra are measured by using the spectrophotometer (Cary 7000, Agilent). Both a-Si and $Si_3N_4$ are deposited in alternating layers with plasma-enhanced chemical vapor deposition (PECVD) at 260° C. without breaking the vacuum chamber. The measured transmission is slightly lower than the calculations and this can be attributed to the reflection at the interface between the air and the bottom of the fused silica substrate, which has not been considered in the simulations. Due to the symmetric configuration of the photonic crystal stack structure, the layers in the stack exhibit the same performance at both top and bottom illuminations, which can further extend such a design into more applications, such as color pigments.

For ternary PCs including the H/2LH/2 unit, the characteristic matrix of one period is $$\overline{M} = \begin{pmatrix} M_{11} & M_{12} \\ M_{21} & M_{22} \end{pmatrix}, \text{ with}$$

$$M_{11} = \cos 2k_{H,x} \cos k_{L,x} - \frac{1}{2}\left(\frac{k_{L,x}}{k_{H,x}} + \frac{k_{H,x}}{k_{L,x}}\right)\sin 2k_{H,x} \sin k_{L,x}$$

$$M_{12} = \frac{k_0 H/2}{ik_{H,x}}\left[\sin 2k_{H,x} \cos k_{L,x} + \frac{1}{2}\left(\frac{k_{L,x}}{k_{H,x}} + \frac{k_{H,x}}{k_{L,x}}\right)\cos 2k_{H,x} \sin k_{L,x} + \frac{1}{2}\left(\frac{k_{H,x}}{k_{L,x}} - \frac{k_{L,x}}{k_{H,x}}\right)\sin k_{L,x}\right]$$

$$M_{21} = -i\frac{k_{H,x}}{k_0 H/2}\left[\sin 2k_{H,x} \cos k_{L,x} + \frac{1}{2}\left(\frac{k_{L,x}}{k_{H,x}} + \frac{k_{H,x}}{k_{L,x}}\right)\cos 2k_{H,x} \sin k_{L,x} - \frac{1}{2}\left(\frac{k_{H,x}}{k_{L,x}} - \frac{k_{L,x}}{k_{H,x}}\right)\sin k_{L,x}\right]$$

$$M_{22} = M_{11}$$

For TE polarization, and $$M_{11} = \cos 2k_{H,x} \cos k_{L,x} - \frac{1}{2}\left(\frac{n_H^2 k_{L,x}}{n_L^2 k_{H,x}} + \frac{n_L^2 k_{H,x}}{n_H^2 k_{L,x}}\right)\sin 2k_{H,x} \sin k_{L,x}$$

$$M_{12} = \frac{n_H^2 k_0 H}{2ik_{H,x}}\left[\sin 2k_{H,x} \cos k_{L,x} + \frac{1}{2}\left(\frac{n_H^2 k_{L,x}}{n_L^2 k_{H,x}} + \frac{n_L^2 k_{H,x}}{n_H^2 k_{L,x}}\right)\cos 2k_{H,x} \sin k_{L,x} + \frac{1}{2}\left(\frac{n_H^2 k_{H,x}}{n_L^2 k_{L,x}} - \frac{n_L^2 k_{L,x}}{n_H^2 k_{H,x}}\right)\sin k_{L,x}\right]$$

$$M_{21} = \frac{-2ik_{H,x}}{n_H^2 k_0 H/2}\left[\sin 2k_{H,x} \cos k_{L,x} + \frac{1}{2}\left(\frac{n_H^2 k_{L,x}}{n_L^2 k_{H,x}} + \frac{n_L^2 k_{H,x}}{n_H^2 k_{L,x}}\right)\cos 2k_{H,x} \sin k_{L,x} - \frac{1}{2}\left(\frac{n_H^2 k_{H,x}}{n_H^2 k_{L,x}} - \frac{n_H^2 k_{L,x}}{n_L^2 k_{H,x}}\right)\sin k_{L,x}\right]$$

$$M_{22} = M_{11}$$

for polarization, $k_{H,x}=k_0 n_H H \cos \theta_H/2$ and $k_{L,x}=k_0 n_L L \cos \theta_L/2$ are the wave vectors along the x direction for the waves propagating in the high and low refractive index layers, respectively, $k_0=\omega(\varepsilon_0\mu_0)^{1/2}$ is the free-space wave vector with $\omega$ as the frequency of incident light, and $\theta_{H(L)}$ is the corresponding propagation angle in each layer determined by the Snell's law. Based on the characteristic matrix, the projected band structure for both polarizations can be calculated from the Bloch wave number $K(\omega,\beta)=\cos^{-1}[M_{11}+M_{22}/2]/\Lambda$ as depicted in FIG. 2A. Here, $\Lambda=H+L$ is the period of the PCs, $\beta=k_0 \sin \theta_0$ is the wave vector in the z direction remaining unchanged during propagation in different layers, and $\theta_0$ is the incidence angle. The shaded region in the plot, which is obtained by setting $(M_{11}+M_{22})/2<1$, corresponds to the propagating Bloch modes, while the blank area represents the stopband calculated with $(M_{11}+M_{22})/2>1$ instead. Since all the modes in the free space must obey $\omega=c(k_{x0}^2+\beta^2)^{1/2}$, the entire blank region above the line $\omega=c\beta$ refers to the modes that cannot directly propagate into the PCs from the surrounding air without additional coupling mechanism. Here, c is the speed of light in air and $k_{x0}$ is the x direction wave vector in air.

As highlighted in FIG. 2A, the wavelength range between the dashed lines going through the open and solid circles (0.16<$\omega\Lambda/2\pi c$<0.24) corresponds to the omnidirectional stopband that will reflect incident light at all angles irrespective of polarizations and is calculated as from 430 nm to 650 nm in terms of wavelength unit. This broad stopband efficiently suppresses the transmission below 650 nm. It can be observed that this omnidirectional stopband is very close to the stopband at normal incidence (the range defined by the dashed lines going through the open circle and square) due to the flat band structure, which leads into the omnidirectional transmission performance with little dispersion at different incident angles. By comparison, the band structure of the PCs having lower refractive index materials with smaller refractive index contrast (i.e., utilizing $TiO_2$ and $SiO_2$ as H and L layers, respectively) is also plotted featuring a much steeper slope and in the ESM, which indicates a significant blue shift of the pass band (or stopband) at large angles of incidence and will be discussed in detail herein. Therefore, the flat band structure directly results from the high refractive indices of the constituent materials (i.e., a-Si and $Si_3N_4$), allowing a small refracted angle into the structure according to Snell's law and exhibiting the great angular-insensitive property. In addition, the refractive indices of the materials are also a key factor affecting the stop bandwidth. As plotted in FIG. 2B, the dependency of the omnidirectional stop bandwidth on the low refractive index material ($n_L$) and refractive index contrast ($n_H/n_L$) reveals that both large $n_L$ and $n_H/n_L$ for achieving a broad omnidirectional stopband.

It is typically challenging to generate wide-angle NIR transmission because a longer cavity thickness to create a resonance at a longer wavelength range is required, resulting in sensitivity to the angle of incidence. To investigate the angular performance of a transmissive-type photonic crystal structure, the calculated and measured angle-resolved transmission spectra are illustrated in FIGS. 3A-3D for both TE and TM polarized light. Obviously, the transmission below 650 nm is effectively blocked at all angles, which is in good agreement with the prediction of the simulation in FIG. 2A. Due to the high refractive indices of the materials, angular insensitivity up to ±60° is observed regardless of polarizations as indicated by the flat dispersion curves in the plot. The simulation is carried out using transfer matrix method and the measured transmission spectra at different angles are obtained by the spectrophotometer (Cary 7000, Agilent) with angle resolved measurement accessory (UMA). Optical images of the fabricated samples at different observing angles under ambient light illumination are provided in FIG. 3E, displaying stable mirror reflection appearance over a wide angular range. This further validates the angular insensitive performance of structures prepared in accordance with certain aspects of the present disclosure and this outstanding characteristic is highly desired in decoration applications. For comparison, the simulated angular-dependent transmission spectra of the structure utilizing the lower refractive index materials based on $TiO_2$ and $SiO_2$, presents a blue-shifted transmission profile and hence the degraded colors with increasing incident angles, which are consistent with the prediction in FIG. 2B.

Hence, compared with the common $TiO_2/SiO_2$ film stack, the a-Si/$Si_3N_4$ stack can greatly improve the incident angular performance and dramatically decrease the split for two polarizations. For a wide variety of applications such as spectral analysis and imaging, the filter is desired to have a much sharper NIR transmission to exclude the severe effects caused by the unwanted light at short wavelengths. Thus, the influence of the number of 'H/2LH/2' unit on the passband (stopband) sharpness is explored. By increasing the number of layers in the stacks, a steeper passband (stopband) close to the ideal case for infinite stacks, which is presented by the band structure in FIG. 2A, can be achieved. When the stack number (i.e., number of individual layers in the stack) reaches seven (7), the steepness of the spectra almost remains unchanged even if further increasing the number of stacks.

The structure discussed above provides angular-insensitive mirror-like reflection and thus is particularly suitable for decorative uses, e.g., hiding the black holes of NIR sensors that are integral to vehicle cockpits and cell phones. Further, other colors in addition to a mirror-like appearance, which are impossible with traditional PCs employing transparent materials, are highly desired. To generate various decorative colors, additional three layers (thin $Si_3N_4$/a-Si/thick $Si_3N_4$) are incorporated on top of the proposed ternary PC structures as depicted in the device 200 in FIG. 4A. The device 200 includes a ternary PC structure 210 that includes three layers 212 of $Si_3N_4$ in alternating arrangement with four layers 214 of amorphous silicon (a-Si) disposed on a glass substrate 216. The device 200 also includes a thin first layer 220 of $Si_3N_4$ that serves as a phase tuning layer, a second intermediate layer 222 comprising amorphous silicon (a-Si) that serves as an absorptive layer, and a thick layer 224 of $Si_3N_4$ that serves as an anti-reflection layer. Different CMY (cyan, magenta, and yellow) colors reflected from the device 200 can be realized by simply adjusting the thicknesses of the added thin $Si_3N_4$ (low refractive index) layer 220 and a-Si (high refractive index) 222 layer, while maintaining the high NIR transmission without changing the bottom PCs 210 as plotted in FIGS. 4B-4D, respectively. Insets in the figures provide the optical images of three colored devices at normal incidence. The slight discrepancy between the simulated and measured results are due to the thickness variation in the deposition process.

The detailed structure configuration of each color is summarized in Table 1. More specifically, structural configurations of CMY colored decorative NIR-transmitting filters prepared in accordance with certain aspects of the present disclosure are detailed in Table 1, where the bottom effective reflectors in all designs employ the same 7-layer PC as shown in FIG. 1A.

TABLE 1

|  | Thin $Si_3N_4$ (nm) | a-Si (nm) | Thick $Si_3N_4$ (nm) |
| --- | --- | --- | --- |
| Cyan | 45 | 25 | 140 |
| Magenta | 30 | 20 | 140 |
| Yellow | 25 | 10 | 140 |

The reflection spectra with sharp dips correspond to distinctive colored appearance of CMY devices with their color coordinates described in the chromaticity diagram as shown in FIG. 4E. One application for these decorative NIR-transmitting filters is to hide the unappealing appearance of sensors used in vehicles and cell phones and these silicon-based NIR sensors typically work near 900 nm. The optical performance of certain devices prepared in accordance with the present teachings is evaluated up to 900 nm. On the other hand, such devices can prove high transmission at even longer wavelengths (e.g., 1.2 μm).

To understand better the mechanism of decorative visibly opaque, but NIR-transmitting structures prepared in accordance with certain aspects of the present disclosure, the yellow colored filter design is used as an example to elucidate the function of each layer. Essentially, the new structure can be effectively simplified into an asymmetric Fabry-Perot cavity by treating the bottom PC stacks as a reflective mirror in the visible, which is illustrated in FIG. 4A. The yellow color is created by suppressing the reflection in the blue color range (light with a wavelength of less than 500 nm, as shown by the reflection dip at approximately 500 nm in FIG. 4D, while maintaining the high reflection intensity of light in the other portion of the visible light range. The suppression of blue light is due to the perfect absorption of a-Si layers (high refractive index layer(s)), which can be seen from the near 100% absorption peak of the total absorption spectrum as depicted in FIG. 5A. This enables the low detection noise in NIR sensor applications by blocking the visible transmission, but allowing only NIR light to pass the stacks, which is impossible with traditional PC structures based on transparent materials. According to the absorption spectra of each a-Si layer, the absorption is mainly ascribed to the first (additionally added 10 nm a-Si) and second a-Si (the top 16 nm a-Si of the bottom PC mirror stacks). By calculating the net phase shifts of the first and second a-Si layers, it is interesting that the added thin $Si_3N_4$ layer (thickness of about 25 nm) between the bottom PC mirror and the top 10 nm a-Si is an effective phase tuning layer that excites the absorption resonances in the blue color range within the absorptive a-Si layers, thereby generating the reflective yellow color. The absorption resonance occurs when the net phase shift is equal to a multiple of $2\pi$, where the net phase shift involves two reflection phases acquired upon reflection from both the top and bottom interfaces and the propagation phase accumulated within the layer.

After adding the thin $Si_3N_4$ phase tuning layer, two closely positioned absorption resonances are excited within the first (#1 at 493 nm) and second (#2 at 504 nm) a-Si layers as shown in FIG. 5B, which significantly enhances the short wavelength absorption and are consistent with the absorption peaks of the corresponding first and second (red and blue) curves in FIG. 5A. For comparison, the net phase shift of the top a-Si layer after removing the $Si_3N_4$ phase tuning layer (in this case, the first and second a-Si layers will become a single layer) is also plotted in the figure and no absorption resonance exists near 500 nm wavelength. The phase tuning function of the added $Si_3N_4$ can be further confirmed by the strong reflection dip of the designed yellow colored NIR-transmitting structure when compared to the reflection spectrum of the stacks without the 25 nm $Si_3N_4$ layer as depicted in FIG. 5C.

On the other hand, the top thick low refractive index layer of $Si_3N_4$ serves as an anti-reflection (AR) layer that maintains the high NIR transmission, which can be clearly observed when comparing the transmission spectra of the stacks with and without the top 140 nm $Si_3N_4$ in the FIG. 5C. The AR resonance occurs at 728 nm as illustrated by the total absorption (black) solid curve in FIG. 5B, where the net phase shift of the top $Si_3N_4$ is equal to a multiple of $2\pi$. FIG. 5D provides the calculated electric field distribution inside the yellow device as a function of wavelength. Confined electric field within the short wavelength range inside the first and second high refractive index a-Si layers (#1 and #2 solid circles) corresponds to strong absorption at approximately 500 nm as the optical absorption is directly proportional to the electric field intensity (Absorption=$(\frac{1}{2})c\varepsilon_0\alpha n|E(x)|^2$, where c is the speed of light, $\varepsilon_0$ is the permittivity of free space, n is the real part of the refractive index, and $\alpha=4\pi k/\lambda$ is the absorption coefficient with k being the imaginary part of the refractive index). Absorption resonances also exist inside the other a-Si layers, but with much weaker intensities (white dashed circle #A), which are consistent with the absorption spectra provided in FIG. 5A. In addition, the strong AR resonance beyond 700 nm inside the top $Si_3N_4$ effectively induces the NIR transmission as seen from the propagating modes in the underneath layers (black dashed elliptical circle #B). All the information extracted from the electric field distribution plot agrees well with the predictions of FIGS. 5A-5C, thus validating the phase tuning and AR functions of additionally added thin and thick $Si_3N_4$ layers, respectively.

Similarly, due to the high refractive indices of both a-Si and $Si_3N_4$ employed in the designs prepared in accordance with certain aspects of the present disclosure, all of the fabricated CMY colored devices present angular-insensitive performance that is particularly suitable for decorative applications. FIGS. 6A-6C provide the calculated angle-resolved reflection spectra of all three colors under unpolarized light illumination, which agree with the measured results presented in FIGS. 6D-6F. The flat dispersion curves in both simulated and measured plots clearly indicate the excellent omnidirectional properties up to ±60°. FIG. 6G presents photographs of fabricated colored samples are taken at several observing directions, further validating the angle-robust decorative appearance.

In summary, colored visibly opaque, but highly efficient NIR-transmitting filters based on 1D ternary PCs have been demonstrated. A wide variety of decorative reflection colors can be created without affecting the high NIR transmission performance, which is impossible with traditional PC structures based on transparent materials. Resulting from the high refractive index contrast between the materials employed in the design, as well as the absorption loss of semiconductors, the NIR filters prepared in accordance with certain aspects of the present disclosure effectively blocks visible transmission in a photonic crystal stack having only 7 layers, which is far fewer than conventional photonic crystal devices. It also exhibits great angle-robust performance up to ±60° irrespective of the polarization state of incident light at both top and back incidence, due to the high refractive index of the materials. Moreover, the methods of fabricating such devices are simple and straightforward, where only the deposition step needs to be involved, thus providing an attractive route towards large-scale structural filters in a variety of applications such as imaging, displays, holography, and especially NIR-sensor decorations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical filter comprising:
 a photonic crystal stack comprising at least four high refractive index layers each having a first refractive index of greater than or equal to about 2 and each defining a first side and an opposite second side and at least three low refractive index layers having a second refractive index of less than or equal to about 2 and at least two of the three low refractive index layers respectively disposed along the first side and the opposite second side of one of the four high refractive index layers, wherein a refractive index contrast between each high refractive index layer and each low refractive index layer is greater than or equal to about 40% and the photonic crystal stack has less than or equal to 10 total layers including the at least three low refractive index layers and at least four high refractive index layers to define a one-dimensional ternary photonic crystal, wherein the at least four high refractive index layers each has a thickness of greater than or equal to about 10 nm to less than or equal to about 25 nm and the optical filter is capable of transmitting a first portion of an electromagnetic spectrum having a first range of predetermined wavelengths in an infrared light range or near infrared light range and reflecting a second portion of the electromagnetic spectrum having a second range of predetermined wavelengths in a visible light range to generate a reflected output.

2. The optical filter of claim 1 that displays angle insensitive behavior, wherein the reflected output displays minimal angle dependence such that the second range of predetermined wavelengths varies less than or equal to about 80 nm at an incidence angle ranging from about 0° to about 60° with respect to the optical filter to form an angle insensitive colored filter.

3. The optical filter of claim 1, wherein the photonic crystal stack comprises 7 layers.

4. The optical filter of claim 1, wherein a difference between the at least one high refractive index layer and at least one of the at least two second refractive index layers is greater than or equal to about 0.5.

5. The optical filter of claim 1, wherein the photonic crystal stack is disposed on a transparent substrate.

6. The optical filter of claim 1, wherein each high refractive index layer independently comprises a material selected from the group consisting of: semiconductors comprising amorphous silicon (a-Si), germanium (Ge), metal oxides and sulfides, semiconductor nitrides comprising ferric oxide ($Fe_2O_3$), cupric oxide (CuO), vanadium pentoxide ($V_2O_5$) titanium oxide ($TiO_2$), zinc oxide (ZnO), hafnium oxide ($HfO_2$), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof.

7. The optical filter of claim 1, wherein each low refractive index layers independently comprises a material selected from the group consisting of: semiconductor oxides or nitrides comprising silicon nitride ($Si_3N_4$), silicon dioxide ($SiO_2$), metal oxides and sulfides comprising zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof.

8. The optical filter of claim 1, wherein greater than or equal to about 40% of the first portion of an electromagnetic spectrum having the first range of predetermined wavelengths is transmitted through the optical filter.

9. The optical filter of claim 1, wherein each of the at least three low refractive index layers has a thickness of greater than or equal to about 25 nm to less than or equal to about 150 nm.

10. The optical filter of claim 1, wherein the reflected output with the second range of predetermined wavelengths has a color selected from the group consisting of: black, red, green, blue, white, cyan, magenta, yellow, and combinations thereof.

11. The optical filter of claim 1, wherein each of the at least four high refractive index layers comprises an amorphous silicon (a-Si) and each of the at least three low refractive index layers comprise silicon nitride ($Si_3N_4$).

12. The optical filter of claim 1, wherein the at least three low refractive index layers comprise a first low refractive index layer and a second low refractive index layer, wherein the first low refractive index layer has a thickness of greater than or equal to about 25 nm to less than or equal to about 45 nm, the second low refractive index layer has a thickness of greater than or equal to about 130 nm to less than or equal to about 150 nm.

13. The optical filter of claim 1, wherein the optical filter is in a form of a plurality of pigment particles.

14. A device comprising the optical filter of claim 1, wherein the device is selected from the group consisting of: an imaging sensor, an optical measurement system, a mobile device, a vehicle, a decoration, an anti-counterfeit tag, and combinations thereof.

15. A process of making a plurality of optical filter particles comprising:

forming a photonic crystal stack via a vacuum deposition process, wherein the photonic crystal stack comprises at least four high refractive index layers having a first refractive index of greater than or equal to about 2, wherein each high refractive index layer defines a first side and an opposite second side and at least three low refractive index layers having a second refractive index of less than or equal to about 2 and at least two of the three low refractive index layers respectively disposed along the first side and the opposite second side, wherein a refractive index contrast between the at least one high refractive index layer and at least one of the two low refractive index layers is greater than or equal to about 40% and the photonic crystal stack has less than or equal to 10 total layers including at least three low refractive index layers and at least four high refractive index layers to define a one-dimensional ternary photonic crystal, wherein the at least four high refractive index layers each has a thickness of greater than or equal to about 10 nm to less than or equal to about 25 nm and the photonic crystal stack is capable of transmitting a first portion of an electromagnetic spectrum having a first range of predetermined wavelengths in an infrared light range or near infrared light range and reflecting a second portion of the electromagnetic spectrum having a second range of predetermined wavelengths in a visible light range to generate a reflected output; and breaking the photonic crystal stack into a plurality of pigment particles capable of being applied to a surface.

16. The process of claim 15, wherein the at least four high refractive index layers comprise an amorphous silicon (a-Si) and the at least three low refractive index layers comprise silicon nitride ($Si_3N_4$).

17. The process of claim 15, wherein the at least three low refractive index layers comprise a first low refractive index layer and a second low refractive index layer, wherein the first low refractive index layer has a thickness of greater than or equal to about 25 nm to less than or equal to about 45 nm, the second low refractive index layer has a thickness of greater than or equal to about 130 nm to less than or equal to about 150 nm.

18. An optical filter comprising:

a photonic crystal stack comprising at least four first layers comprising amorphous silicon (a-Si) each having a thickness of greater than or equal to about 10 nm to less than or equal to about 25 nm and each first layer defining a first side and an opposite second side and at least three second layers comprising silicon nitride ($Si_3N_4$), wherein at least one second layer is respectively disposed along the first side and at least one second layer is disposed on the opposite second side of at least one of the four first layers, wherein the photonic crystal stack has greater than 7 layers and less than or equal to 10 total layers including the at least four first layers and at least three second layers to define a one-dimensional ternary photonic crystal, wherein the optical filter is capable of transmitting a first portion of an electromagnetic spectrum having a first range of predetermined wavelengths in an infrared light range or near infrared light range and reflecting a second portion of the electromagnetic spectrum having a second range of predetermined wavelengths in a visible light range to generate a reflected output.

19. The optical filter of claim 18, wherein the at least three second layers comprise a primary second layer and a secondary second layer, wherein the primary second layer has a thickness of greater than or equal to about 25 nm to less than or equal to about 45 nm, the secondary second layer has a thickness of greater than or equal to about 130 nm to less than or equal to about 150 nm.

* * * * *

UNITED STATES PATENT AND TRADEMARK OFFICE
CERTIFICATE OF CORRECTION

PATENT NO. : 11,579,348 B2
APPLICATION NO. : 16/689701
DATED : February 14, 2023
INVENTOR(S) : Lingjie Jay Guo et al.

It is certified that error appears in the above-identified patent and that said Letters Patent is hereby corrected as shown below:

In the Claims

At Column 18, Claim number 7, Line number 14, delete "layers" and insert --layer--.

Signed and Sealed this
Eighteenth Day of April, 2023

Katherine Kelly Vidal
*Director of the United States Patent and Trademark Office*